Sept. 8, 1936.   R. F. BLATTNER   2,053,513
CAMERA SHUTTER
Filed Dec. 28, 1935
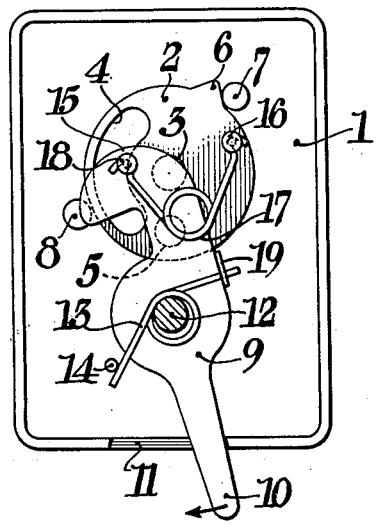
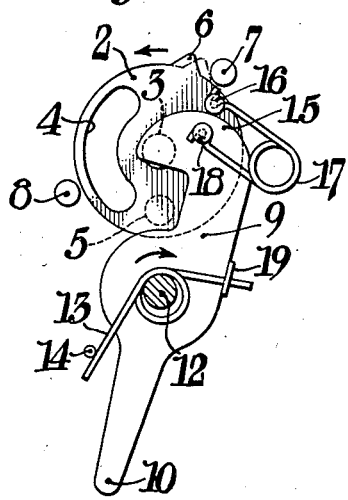
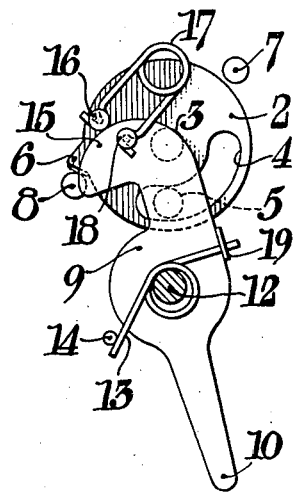
Robert F. Blattner,
INVENTOR:
BY
ATTORNEYS.

Patented Sept. 8, 1936

2,053,513

UNITED STATES PATENT OFFICE 2,053,513

CAMERA SHUTTER

Robert F. Blattner, Rochester, N. Y., assignor to Eastman Kodak Company, Rochester, N. Y., a corporation of New York Application December 28, 1935, Serial No. 56,516

6 Claims. (Cl. 95—60)

This invention relates to photography, and more particularly to shutters for inexpensive types of cameras. One object of my invention is to provide a shutter containing a minimum number of parts which are of simple construction and which may be easily assembled and sure in operation. Another object of my invention is to provide a shutter with a means for positively starting the movement of the shutter blade which may be completed by the usual spring arrangement. Another object of my invention is to provide a shutter in which there will always be the same tension on the operating spring at the point from which the spring moves the shutter blade. Another object of my invention is to provide a shutter of the type in which a trigger sets and trips an operating spring, in which the first part of the trigger movement definitely moves the shutter so that the inertia of starting the shutter blade is taken up by the trigger, and other objects will appear from the following specification, the novel features being pointed out in the claims at the end thereof.

In inexpensive small cameras it is always difficult to provide the proper balance between a spring, a setting member for the spring, and a shutter blade to be moved by the spring because the spring must overcome the inertia of the shutter blade in starting the movement of the blade, and since such shutters are frequently manufactured by comparatively unskilled labor, it is difficult to keep the working parts running free. It has been found that if the shutter blade is started, it requires but little spring pressure to complete the movement of the blade, and in accordance with my present invention I provide a positive means for starting the movement of the blade in two different directions just in advance of the power applied to the shutter blade by the spring.

I am aware that shutters have been provided with springs arranged in such a manner that a starting impulse occurs by a portion of the trigger striking the spring. This is shown in Patent 1,997,331, Fuerst, Camera shutter, April 9, 1934. I have improved the structure shown in this patent by employing a definite contact between the trigger itself and the shutter for starting the movement of the shutter blade.

Coming now to the drawing wherein like reference characters denote like parts throughout:

Fig. 1 is a front plan view of a shutter with the cover removed, constructed in accordance with and embodying a preferred form of my invention.

Fig. 2 is a plan view of the shutter parts removed from the casing but with the parts in a starting position.

Fig. 3 is a similar view with the parts shown just before the shutter is returnd to its initial position of rest shown in Fig. 1.

In accordance with the present embodiment of my invention, the front of the camera may be provided with a support 1, on which a shutter blade 2 may be supported by means of a stud 3. The shutter blade 2 is apertured at 4 so that as it oscillates upon its pivot 3 the aperture may swing past an exposure aperture 5 in the support 1 which permits light rays to enter and be focused on the film by the usual lens.

The limits of movement of the shutter blade 2 result from the projection 6 on the shutter blade striking the pins 7 or 8. When in a normal position of rest, the lug 6 rests against the pin 7 as shown in Fig. 1.

In order to cause the shutter blade to oscillate I provide a trigger 9 having an operating handle 10 projecting through a slot 11 in the camera wall. The trigger 9 is mounted to oscillate upon a shaft 12, and a spring 13 contacting with the pin 14 and the lug 19 formed from the trigger 9 normally holds the parts in the position shown in Fig. 1. The end of the trigger 9 is provided with a cam surface 15, this cam surface being adapted to engage a stud 16 on the shutter blade. A spring 17 connects stud 16 and a stud 18 and furnishes the power for operating the shutter.

Thus when the trigger handle 10 is moved in the direction shown by the arrow in Fig. 1, the cam surface 15 moves over into contact with the stud 16, moving the shutter from the position shown in Fig. 1 to that shown in Fig. 2, in which the lug 6 has just moved away from the stop 7. The cam surface 15 has engaged and moved the stud 16 to a point where the spring 17 can rapidly move the shutter blade 2 so that the slot 4 may swing across the exposure opening 5 and make an exposure.

As soon as the handle 10 of the trigger 9 is released this member may swing back to the position shown in Fig. 1 under the impulse of spring 13. However, in doing this the shutter blade 2 must likewise be returned to its initial position. To accomplish this more readily the cam surface 15 again comes into contact with the stud 16, moving the shutter blade 2 through direct contact of the trigger with the shutter blade until the ends of the spring 17 are brought to the position shown in Fig. 3, from which the spring 17 may again cause the shutter to rapidly move to its initial position. An exposure is not made during this movement because as indicated in Fig. 3, a part of the trigger 9 lies over the exposure aperture 5 in the support 1 until after the spring 17 is released and the shutter blade 2 has moved until the lug 6 rests against the stop pin 7.

It will thus be seen that it is possible to utilize a spring 17 of comparatively light weight, since but little pressure is required to move the shutter blade 2 after its movement has been started through direct contact with the trigger member. Moreover, if the shutter blade 2 should for any reason stick upon its pivot, the pressure on the trigger 9 would positively start the movement of the blade 2 which could then be readily completed by means of its spring.

While I have described and illustrated an extremely simple type of shutter, in which the shutter blade makes an exposure in moving in one direction only, it is obvious that any shutter including a shutter blade and trigger in which the former element is operated by a spring may be improved by providing a positive means for starting the movement of the blade, before an exposure is commenced, through direct engagement with a trigger. I therefore consider as within the scope of my invention any such shutter as may come within the scope of the appended claims.

What I claim is:

1. In a photographic shutter, the combination with a support, of a blade pivotally mounted upon said support, a spring, a trigger for actuating the blade through the spring, said shutter blade and trigger including interengaging parts whereby said blade may be moved through direct engagement of said trigger.

2. In a photographic shutter, the combination with a support, of a blade pivotally mounted upon said support, a spring, a trigger for actuating the blade through the spring, said shutter blade and trigger including interengaging parts comprising a projection on one part and a cam on the other through which the trigger may directly engage and start movement of the shutter blade which may then be moved through its spring.

3. In a photographic shutter, the combination with a support, of a blade pivotally mounted upon said support, a spring, a trigger for actuating the blade through the spring, said shutter blade and trigger including interengaging parts comprising a pin carried by the shutter blade and having a position of rest lying in the path of a cam on the trigger, whereby movement of the trigger cam may positively move the shutter blade into a position from which the blade may be solely moved by the spring.

4. In a photographic shutter, the combination with a support, of an apertured blade pivotally mounted thereon, an exposure opening in the support adapted to pass light when the blade aperture registers therewith, a trigger for operating the shutter including a cam carried by the trigger, a projection on the shutter normally lying in the path of the cam, whereby movement of the trigger may engage and move the shutter on its pivot, and a spring connected to the apertured blade and adapted to be tensioned by the shutter, whereby movement of the blade started by the cam may be completed by the spring.

5. In a photographic shutter, the combination with a support, of an apertured blade pivotally mounted and adapted to oscillate thereon, an exposure opening in the support adapted to pass light when the blade aperture registers therewith, a trigger for operating the shutter in two directions including a cam carried by the trigger, a projection on the shutter normally lying in the path of the cam, whereby movement of the trigger in either direction may engage and move the shutter on its pivot, and a spring connected to the apertured blade and adapted to be tensioned by the trigger, whereby movement of the blade started by the cam may be completed by the spring.

6. In a photographic shutter, the combination with a support, of a blade pivotally mounted thereon, a spring for moving the blade, a trigger for setting and releasing the spring, a cam on the trigger for moving the blade, whereby the blade may be moved first through direct engagement with the trigger cam and second through the spring set and released by the trigger.

ROBERT F. BLATTNER.